United States Patent [19]

Hayashi et al.

[11] 4,266,276

[45] May 5, 1981

[54] CUTTING CONTROL APPARATUS

[75] Inventors: Shigeki Hayashi, Tokyo; Takemitsu Okamoto, Atsugi, both of Japan

[73] Assignee: Nusco Kabushiki Kaisha, Tokyo, Japan

[21] Appl. No.: 81,958

[22] Filed: Oct. 4, 1979

[30] Foreign Application Priority Data

Oct. 4, 1978 [JP] Japan .................. 53/122973

[51] Int. Cl.³ .................. G06F 15/46; B26D 5/20
[52] U.S. Cl. .................. 364/475; 83/76; 318/601
[58] Field of Search .................. 364/474, 475; 83/71, 83/72, 74, 75, 76; 318/600, 601, 603

[56] References Cited

U.S. PATENT DOCUMENTS

| | | | |
|---|---|---|---|
| 3,668,957 | 6/1972 | Nido | 83/76 X |
| 4,020,406 | 4/1977 | Tokuno et al. | 83/76 X |
| 4,091,315 | 5/1978 | Hayashi et al. | 83/76 X |
| 4,170,155 | 10/1979 | Saito et al. | 83/76 |

*Primary Examiner*—Joseph F. Ruggiero

*Attorney, Agent, or Firm*—Pollock, Vande Sande & Priddy

[57] ABSTRACT

A cutting control apparatus for cutting, by a rotary type flying cutter, a sheet, pipe or like material fed by a feeder. On the basis of a synchronous cutting length corresponding to setting of a blade speed change mechanism of the flying cutter and one of a travelling speed signal of the material and the revolving speed of a blade of the cutter, a reference speed signal is produced for the other of the material travelling speed and the blade revolving speed. One of a signal related to length-measuring pulses corresponding to the distance of travel of the material and a signal related to rotation pulses corresponding to the rotation of the blade is applied as an additive input to an adder, and the other is applied as a subtractive input to the adder. The adder is supplied, for each cutting, with a correction value calculated by an arithmetic circuit on the basis of a set cutting length and the synchronous cutting length, and the output from the adder is converted into an analog signal, which is used as a correction signal for the reference speed signal.

10 Claims, 5 Drawing Figures

CUTTING CONTROL APPARATUS

BACKGROUND OF THE INVENTION

This invention relates to a cutting control apparatus for cutting into a set length, by a flying cutter, a sheet, pipe or like material fed by a material feeder, such as a leveler, a pinch roll or the like.

In a conventional flying cutter, the revolving speed of a cutting blade is controlled by a speed change mechanism for cutting length setting use, such as a stepless speed change gear, and a material to be cut is fed at a constant speed. To increase the cutting length of the material, the revolving speed of the blade is reduced to increase the length of the material being fed during one rotation of the cutter; and to reduce the cutting length of the material, the revolving speed of the blade is raised. That is to say, the blade is driven at a constant speed during one rotation, and the length of a material fed during one rotation of the blade is the cutting length of the material, so that to change the cutting length of the material, the revolving speed of the blade must be changed by the abovesaid speed change mechanism. Since such a change in the revolving speed of the blade cannot be made finely, the dimensional accuracy of the cutting operation is low.

In the case where the moving speeds of the blade and the material are not equal to each other when the blade makes contact with the material, the material is sometimes not cut neatly or the blade may be broken. To avoid this, in the prior art, use is made of a blade speed change mechanism, by which during each rotation of the blade, a rocking movement of the blade is added to its ratational movement; consequently, during each rotation the revolving speed of the blade varies about its mean revolving speed. The blade speed change mechanism is adjusted so that the speed of the blade when making contact with the material may be equal to the moving speed of the latter. For example, when it is desired to increase the material cutting length, since the revolving speed of the blade is reduced, as described above, the blade speed change mechanism is adjusted in such a manner that the blade is brought into contact with the material at a speed higher than the mean speed of the blade during one rotation thereof. Since operation for this adjustment is relatively troublesome, however, changing of a set value for cutting often results in markedly lowered cutting efficiency. Further, since the range in which the revolving speed of the blade is adjustable is relatively narrow, the range over which the material cutting length can be altered is also narrow.

An object of this invention is to provide a cutting control apparatus which employs, in place of the conventional speed change mechanism for cutting length setting use, a numerical control servo mechanism to permit easy setting of the cutting length and to provide for enhanced accuracy in the cutting operation, and which employs a blade speed change mechanism, such as employed in the past, to reduce speed changes of a servo motor, whereby to prevent inertia from being an obstacle to high-speed cutting, and which is adapted so that mechanical synchronization setting need not be altered for each small change in the cutting length.

Another object of this invetion is to provide a cutting control apparatus which permits a correct cutting operation even if a synchronous cutting length corresponding to setting of the blade speed change mechanism, for example the set angle of an eccentric gear and the material cutting length, differ from each other.

SUMMARY OF THE INVENTION

In the cutting control apparatus of this invention, the material cutting length and the synchronous cutting length are set, for example, by digital switches. Length-measuring pulses are generated by a length-measuring pulse generator corresponding to the distance of travel of the material, and the pulse frequency, that is, the travelling speed of the material, is divided by the synchronous cutting length, and the divided output is applied as a reference speed signal to a motor for driving the cutter. The length-measuring pulses are, upon each occurrence thereof, multiplied by a coefficient inversely proportional to the synchronous cutting length, thereafter being applied to an adder so that the input is added to the value of the adder. Rotation pulses are generated corresponding to the motor and are each multiplied by a constant coefficient, thereafter being provided to the adder so that the input is subtracted from the value of the adder. In other words, the adder serves as a positive and negative accumulator. Moreover, a correction value is calculated on the basis of the set cutting length and the synchronous cutting length and is applied to the adder once upon completion of one cutting in preparation for the next cutting operation; namely, the correction value is applied to the adder prior to each cutting operation. The output from the adder is converted into an analog signal, which is provided as a correction signal for the reference speed signal to the cutter driving motor.

In the above, the two inputs to the adder, corresponding to the length-measuring pulse and the rotation pulse respectively, may also be exchanged with each other. In such a case, the rotation pulse generated corresponding to the rotation of the motor is multiplied by a coefficient proportional to the synchronous cutting length and is applied to the adder subtractively, and the length-measuring pulse corresponding to the distance of travel of the material is multiplied by a constant coefficient and is applied to the adder additively, and further, a value calculated for correction, on the basis of the set cutting length and the synchronous cutting length, is provided to the adder for each cutting operation.

In the above, it is also possible to fix the revolving speed of the blade and to control the feedrate of the material during one rotation of the blade instead of the cutter driving motor. In this case, the value of the revolving speed of the cutter driving motor multiplied by the synchronous cutting length, is supplied as a reference speed signal to the motor for feeding the material. The length-measuring pulse corresponding to the rotation of the material feeding motor is multiplied by a fixed constant and is then applied to the adder subtractively, while at the same time the rotation pulse corresponding to the rotation of the cutter driving motor is multiplied by the synchronous cutting length and is then applied to the adder additively. Further, a numerical value calculated for correction, corresponding to the cutting length and the synchronous cutting length is provided to the adder once for each cutting operation. The output from the adder is converted into an analog signal, which is provided as a speed correction signal for the material feeding motor.

DESCRIPTION OF THE PREFERRED EMBODIMENTS

Figure 1:
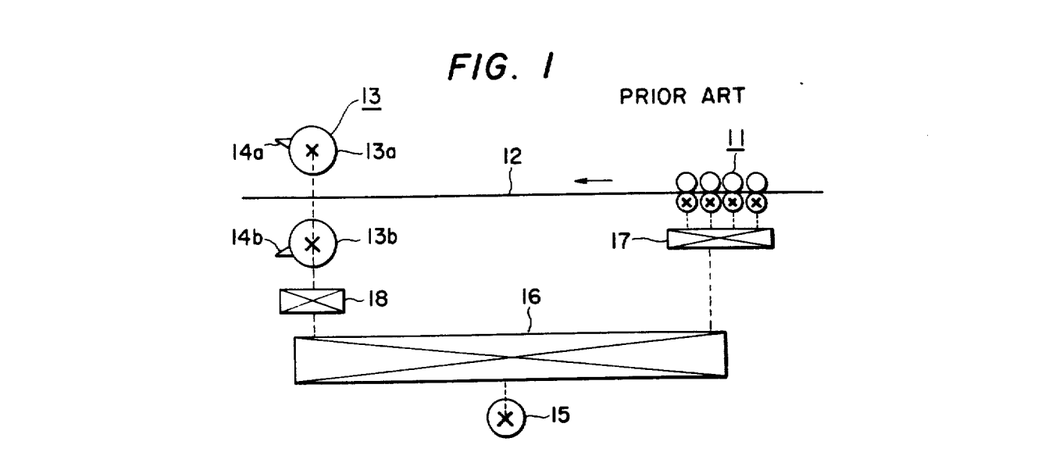
FIG. 1 is a schematic diagram showing a conventional flying cutting machine.

To facilitate a better understanding of the present invention, a description will be given of a conventional cutting control apparatus with reference to FIG. 1.

A material to be cut, for example, an iron or like sheet 12 is fed by a feed gear, for example a leveler 11 to a flying cutter, for instance a shear 13 and is cut by blades 14a and 14b of a pair of drum shears 13a and 13b which are brought into contact with the sheet 12 from above and below. The revolving speed of a drive motor 15 is changed by a speed change gear 16 one of whose output shafts drives a distribution gear 17 thereby to rotate the leveler 11, and whose other output shaft drives an eccentric gear 18 thereby to rotate the drum shears 13a and 13b. In the speed change gear 16, the length into which the material 12 is to be cut is set by switching of the gear ratio of the change 16 and the speed change ratio of a stepless speed change gear.

When the blades 14a and 14b are in contact with the material 12, if the running speed of the blades is different from the travelling speed of the material 12, the blades 14a and 14b are likely to be damaged or the cut of the material 12 is not clean. To avoid this, use is made of a blade speed change mechanism for synchronization use, that is, the abovesaid eccentric gear 18, in addition to the abovementioned speed change gear for cutting-length setting use, that is, the speed change gear 16. By the eccentric gear 18, the drum shears 13a and 13b are driven in such a manner that during each rotation, the speed of their blades 14a and 14b varies about a certain value. To increase the length into which the material 12 is cut, the travelling speed of the material 12 is held substantially constant, but the mean revolving speed of the shear 13 is reduced by the speed change gear 16 so that the distance of travel of the material 12 increases during one rotation of the blades 14a and 14b. To perform this, the angles of the blades 14a and 14b to the eccentric gear 18 are set mechanically in such a manner that during one rotation of time, the blades 14a and 14b of the drum shears 13a and 13b are brought into contact with the material 12 at a speed higher than their mean revolving speed. The cutting length which is obtained when the running speed and the angle of each drum shear are set correctly, is what is called the synchronous cutting length. Conversely, to decrease the cutting length, the mean rotating speed of the speed change output shaft on the side of the shear is raised; accordingly, the synchronization is so set that the blades 14a and 14b make contact with the material 12 at a speed lower than their mean rotating speed.

The limit of adjustability of the blade speed change mechanism 18 for synchronization imposes limitations on maximim and minimum cutting lengths, and the permissible range of variations in the cutting length is relatively narrow; namely, the ratio between the maximum and minimum cutting lengths is only about 1:2, for instance. Therefore, it is difficult to cut the material into longer and shorter lengths outside such range of variations. On top of that, it is very troublesome to set the blade speed change mechanism, for example, to adjust the angle of the eccentric gear 18 each time the material cutting length is altered.

Figure 2:
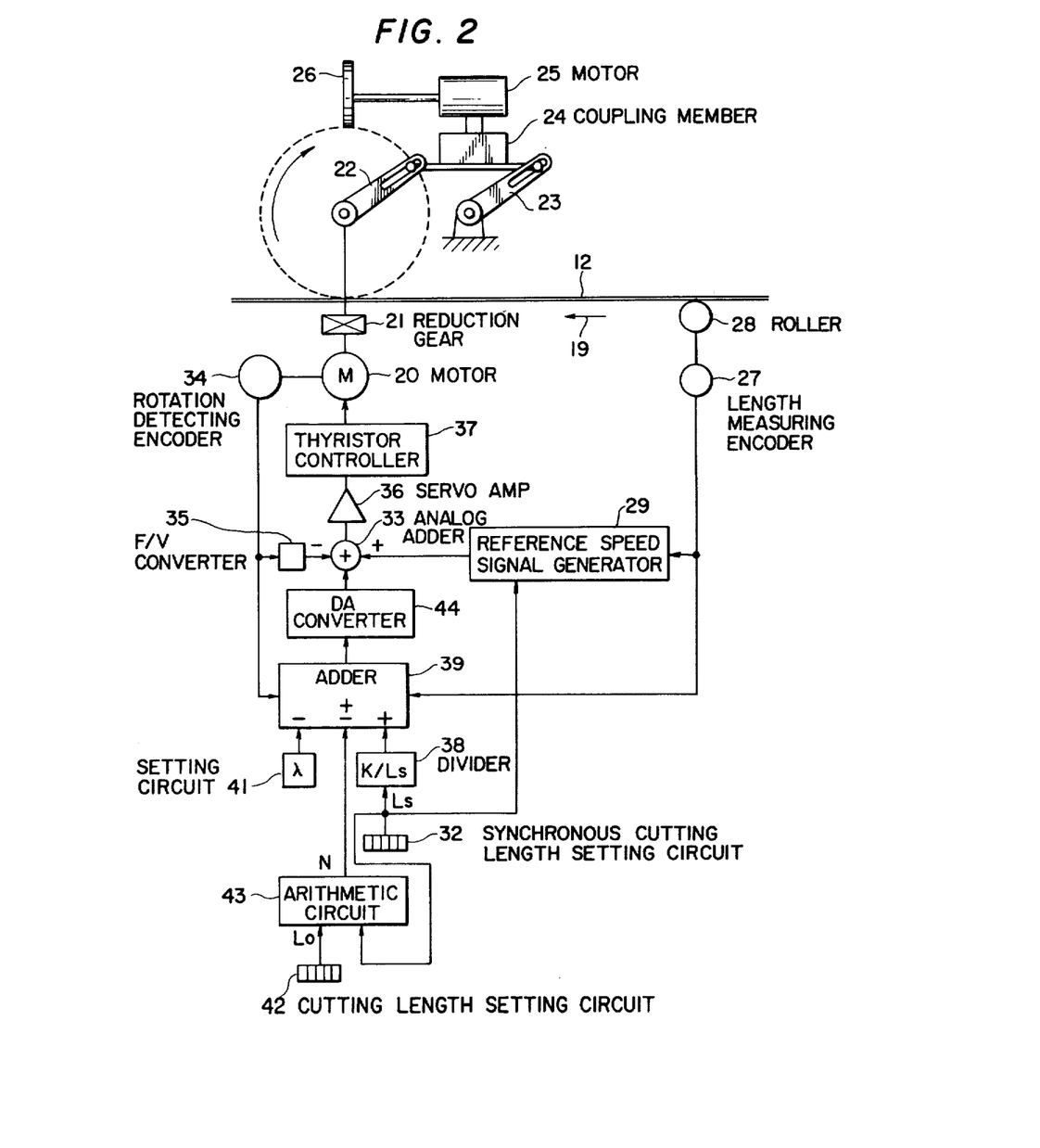
FIG. 2 is a block diagram illustrating an embodiment of the cutting control apparatus of this invention as used to control the rotation of the blade.

FIG. 2 illustrates an embodiment of the cutting control apparatus of the present invention. In FIG. 2, the material 12 is fed, in the direction of an arrow 19, by feed means such as a leveler, a pinch roller or the like though not shown. As the drum shear 13, a rotary saw is employed in this embodiment. The rotation of a motor 20 is transmitted, if necessary via a reduction gear 21, to a rotary shaft affixed to one end of a rotary arm 22, driving the rotary arm 22 to rotate about that one end. Another rotary arm 23 is rotatably supported at one end by a stationary part. The other ends of the rotary arms 22 and 23 are coupled to each other by a coupling member 24, on which is mounted a motor 25 for rotating a cutter 26. The cutter 26 is rotated by the motor 25 while at the same time revolving about the center of rotation of the rotary arm 22. The locus of revolution of the cutter 26 by the rotation of the rotary arm 22 passes along the path of travel of the material 12 at one position, where the material 12 is cut by the cutter 26. In order that when the cutter 26 makes contact with the material 12, the revolving speed of the former may be equal to the travelling speed of the latter, the coupling member 24 is moved on the rotary arms 22 and 23 in their lengthwise direction, thereby adjusting the radius of gyration of the cutter 26 to regulate its revolving speed. The revolving speed of the cutter 26 at which its component in the direction of travel of the material 12 is equal to the travelling speed of the material 12 will hereinafter be referred to as the synchronous speed.

A length-measuring encoder 27 is provided for generating pulses corresponding in number to the distance of travel of the material 12. To this end, a roller 28 is held in rotary contact with the material 12, and by the rotation of the roller 28, the encoder 27 is driven. Length-measuring pulses yielded by the encoder 27 are provided to a reference speed signal generator 29 including a frequency-to-voltage converter, and the converted voltage is divided by a synchronous cutting length $L_s$, providing a reference speed signal. In the reference speed signal generator 29, for example, the length-measuring pulses are subjected to a frequency-to-voltage conversion, and the converted output is applied to a level regulator, such as a variable-gain circuit or variable attenuator to regulate the gain of the level regulator to $1/L_s$. Alternatively, the length-measuring pulses are applied first to a coefficient multiplier to thin out pulses corresponding in number to $1/L_s$, and then the thinned-out output is subjected to a frequency-to-voltage conversion. The synchronous cutting length $L_s$ is, in this case, the length of circumference of rotation of the blade of the cutter 26, and this length $L_s$ is set by a synchronous cutting length setting circuit 32. The output from the reference speed signal generator 29 is applied to an analog adder 33, as a speed standard for the motor 20. Where the set length $L_s$ is large, this speed standard is reduced, resulting in the revolving speed of the rotary arm 22 being decreased.

An encoder 34 for detecting the rotation of the cutter 26 is driven by the motor 20 to produce rotation pulses corresponding in number to the rotation of the blade, i.e. the cutter 26 in this case. The rotation pulses are applied to a frequency-to-voltage converter 35 to detect a revolving speed signal of the motor 20, which is applied as a feedback signal to the analog adder 33. The output from the analog adder 33 is provided via a servo amplifier 36 to a thyristor controller 37, which controls the rotation of the motor 20 in accordance with the output from the servo amplifier 36.

The synchronous cutting length $L_s$ set by the setting circuit 32 is supplied to a divider 38 to obtain a value $K/L_s$. In an adder 39, the output from the length-measuring encoder 27 is multiplied by the value $K/L_s$, and the resulting value is added to a value in the adder 39. In other words, upon each occurrence of the length-measuring pulse from the encoder 27, the value $K/L_s$ is accumulatively added to the value of the adder 39. Further, the output from the cutter rotation detecting encoder 34 is multiplied by a constant set value $\lambda$ from a setting circuit 41, and the resulting value is supplied to the adder 39 to subtract its value. In other words, upon each occurrence of the rotation pulse from the encoder 34, the set value $\lambda$ is subtracted from the value of the adder 39. A cutting length $L_O$ for the material 12 is set in a setting circuit 42, and this cutting length $L_O$ and the synchronous cutting length $L_s$ are provided to a correcting arithmetic circuit 43 to perform such a corrective operation as described hereinbelow. The operation result is applied as a correction value N to the adder 39 for each cutting operation and is used as the value of the adder 39. The adder 39 performs an additive operation, for example, in terms of binary number (or binary-coded decimal number) and has an arrangement such that the correction value N is first loaded in an adding register and, upon each occurrence of the length-measuring pulse, the value $K/L_s$ in the form of a binary number is added to the adding register, whereas upon each occurrence of the rotation pulse, a complement of $\lambda$ in the form of a binary number is added to the adding register.

Letting the number of pulses generated by the encoder 34 during one revolution of the cutter 26 and the number of pulses generated by the encoder 27 for each travel of the material 12 over unit distance be represented by $N_s$ and $N_m$, respectively, the number which is subtracted from the value of the adder 39 by the pulses from the encoder 34 during one revolution of the cutter 26 is $N_s \cdot \lambda$, and the number which is added to the value of the adder 39 by the pulses from the encoder 27 based on the movement of the material 12 over the cutting length $L_O$, is $L_O N_m (K/L_s)$. In order to cut the material 12 into the length $L_O$, it is necessary that these values and the correction value from the arithmetic circuit 43 bear the following relationship:

$$-N_s\lambda + L_O N_m(K/L_s) + N = 0 \qquad (1)$$

The reason for the right side of the above expression is that since the output from the adder 39 at the moment of cutting the material 12 is substantially constant, the sum of the inputs to the adder 39 in the time interval between cutting operations, that is, the left side of the above expression, can be regarded as substantially zero.

Now, letting $N_s\lambda = N_m K$, the expression (1) can be written as follows:

$$N = N_s\lambda(1 - L_O/L_s)$$

The output from the adder 39 is converted by a D-A converter 44 into an analog signal, which is applied as a speed correction signal to the analog adder 33.

When $L_O = L_s$, that is, when the synchronous cutting length $L_s$ and the cutting length $L_O$ are equal to each other, $N=0$; and when $L_O > L_s$, N becomes negative. Immediately after the cutting operation, the correction value N is applied to the adder 39 once in preparation for the next cutting, so that when the correction value N is applied in negative form to the adder 39, the motor 20 is decelerated, and the revolving speed of the cutter 26 thus decelerated is restored to the synchronous speed until the cutter 26 is brought into contact with the material 12. Conversely, in the case of $L_O > L_s$, the correction value N is positive, and when this value is applied to the adder 39, the revolving speed of the cutter 26 becomes higher than the synchronous speed but is reduced to the synchronous speed until the cutter 26 is moved into contact with the material 12.

That is to say, since the rotary arm 22 rotates at same speed in the prior art, the cutting length of the material is fixed once the synchronous speed of the cutter 26 (which corresponds to the synchronous cutting length $L_s$) is set; therefore, even if it is attempted to cut the material into a longer or shorter length, the revolution of the cutter and the movement of the material are not synchronized with each other, with the result that the cutter is damaged or the material cannot be cut neatly. To change the cutting length, it is necessary to re-set both the speed change mechanism 16 for cutting length setting use and the blade speed change mechanism 18, and this re-setting is very troublesome. In the present invention, however, the synchronous speed of the cutter 26 is set mechanically by setting, for example, the length of arms 22 and 23, and in accordance with this, the synchronous cutting length $L_s$ is set; and even if this length $L_s$ is not changed, when the cutting length $L_O$ is altered, the correction value N corresponding thereto is applied to the adder 39, and by the output therefrom, the rotating speed of the motor 20 is corrected. As a result of this, the rotating speed of the rotary arm 22 is changed during its one rotation, whereby when the cutter 26 makes contact with the material 12, they are synchronized in speed with each other as if the cutting length is $L_s$. Consequently, even when the cutting length is altered, there is no fear of the cutter 26 being damaged, and the material 12 is cut neatly. Thus, the apparatus of this invention is free from the troublesome adjustment of moving the coupling member 24 along the rotary arms 22 and 23 to change the revolving speed of the cutter 26 each time the cutting length $L_O$ is changed. Only when the cutting length is altered greatly, the coupling member 24 is moved along the rotary arms 22 and 23 to modify the setting of the synchronous cutting length $L_s$. In this way, the range in which the cutting length can be selectively changed by shifting the coupling member 24 is also enlarged by the supply of the correction value N to the adder 39. Although the variable range of control by the motor 20 itself is not wide in high-speed cutting control because of inertia of mechanical parts, the range can be enlarged by combining the adjustment of the length of arms 22, 23 with the control by the motor 20. Since $N_s \cdot \lambda$ becomes constant once the apparatus used is determined, it will suffice to apply the lengths $L_O$ and $L_s$ as variables to the arithmetic circuit 43.

Figure 3:
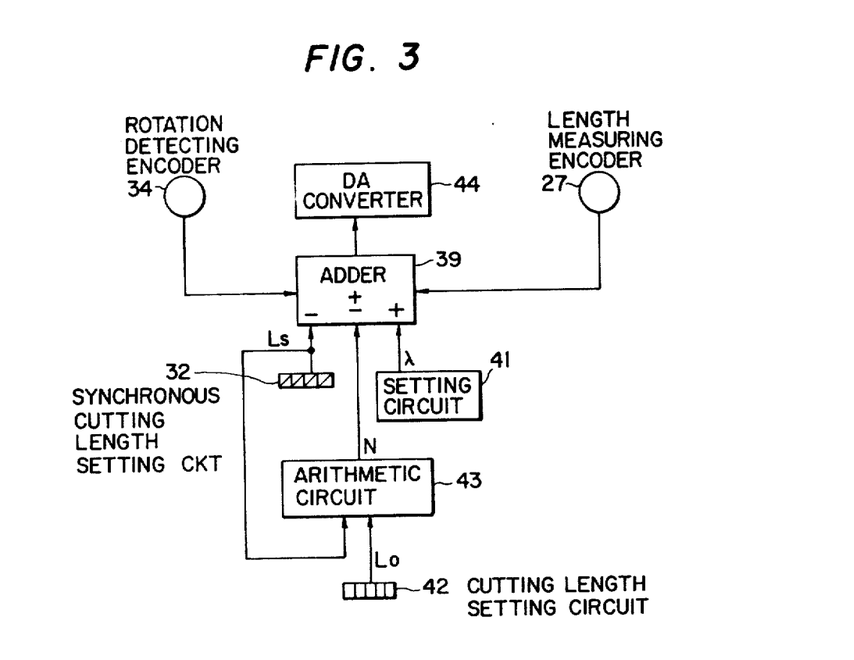
FIG. 3 is a block diagram showing the principal part of a modified form of the embodiment of FIG. 2 in which, upon each occurrence of a pulse from a cutter rotation detecting encoder, a value corresponding to the synchronous cutting length is applied to the adder.

In the above, the value corresponding to the synchronous cutting length is supplied to the adder 39 upon each occurrence of the pulse from the length-measuring encoder 27 but may also be applied upon each occurrence of the pulse from the encoder 34 for cutter rotation detecting use. For example, as shown in FIG. 3, upon each occurrence of the pulse from the encoder 34, the synchronous cutting length $L_s$ from the setting circuit 32 is provided to the adder 39 to subtract the value $L_s$ from the value of the adder 39, and upon each occurrence of the pulse from the encoder 27, the fixed coefficient $\lambda$ from the setting circuit 41 is applied to the adder 39 for addition to the value of the adder 39. In this case, it is necessary that the following expression hold:

$$-N_s L_s + L_O N_m \lambda + N = O \quad (2)$$

If $N_s = N_m \lambda$, it follows that $N = N_s L_s (1 - L_O/L_s)$. In the arithmetic circuit 43, N is operated and provided to the adder 39 once for each cutting.

Figure 4:
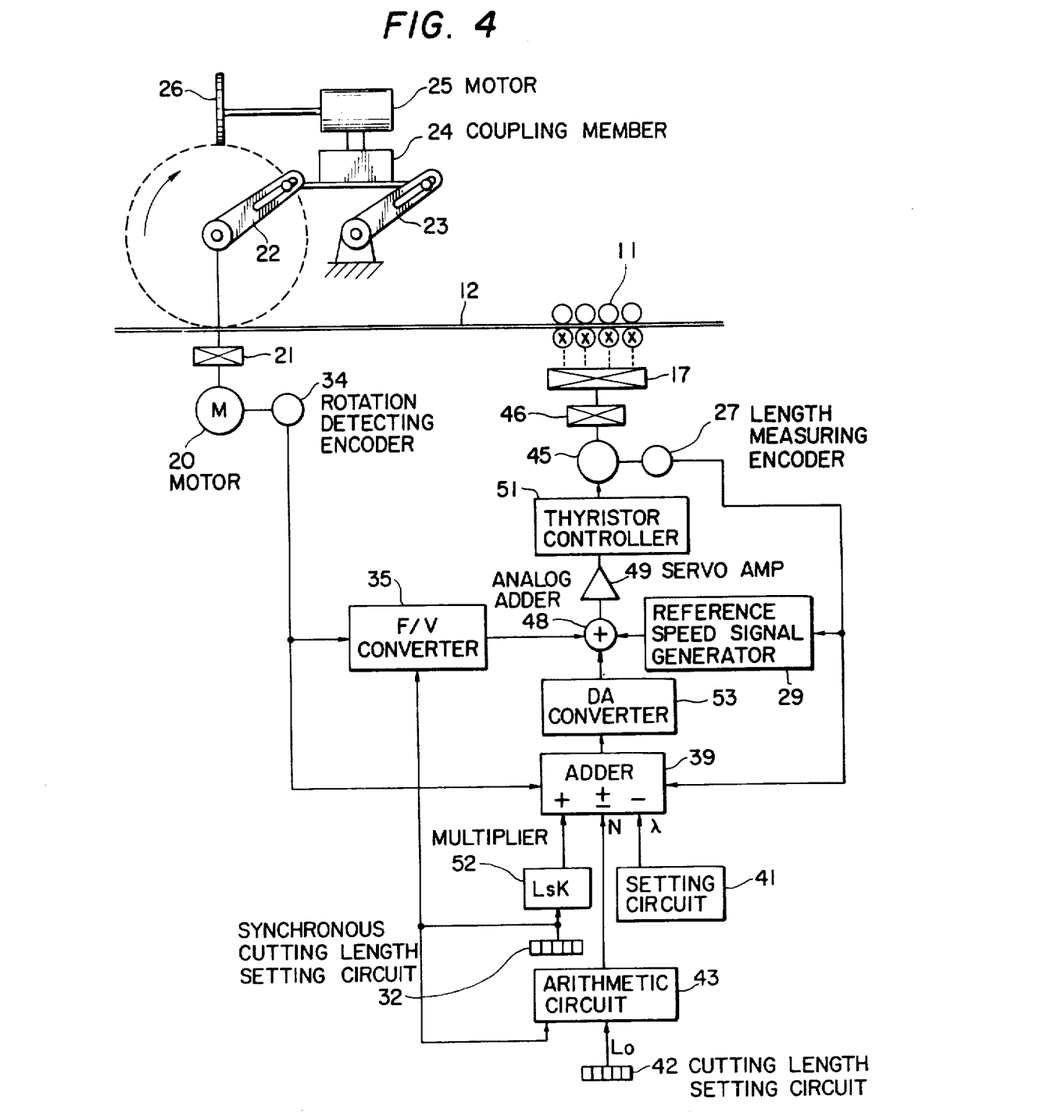
FIG. 4 is a block diagram illustrating another embodiment of this invention as used to control the feed of the material.

Further, in the above, the motor 20 for driving the flying cutter 13 is controlled so that the material 12 is cut into the set length; but a motor for feeding the material 12 may also be controlled instead of the motor 20. FIG. 4 illustrates, by way of example, an arrangement therefor. In FIG. 4, parts corresponding to those in FIG. 2 are identified by the same reference numerals. A motor 45 for feeding the material 12 is provided, and the rotation of the motor 45 is transmitted to the distribution gear 17, if necessary through a reduction gear 46, and the distribution gear 17 drives the leveler 11 to feed the material 12. The frequency of pulses from the encoder 34 representing the revolving speed of the motor 20 for driving the cutter is multiplied by the synchronous cutting length $L_s$ in the reference speed signal generator 29. The multiplied output is provided in analog form from the reference speed signal generator 29 and applied as a speed standard to an analog adder 48. To the analog adder 48 is also supplied, as a feedback signal, the material feedrate signal from the frequency-to-voltage converter 35. In this example, the length-measuring encoder 27 is driven by the motor 45. The output from the analog adder 48 is applied via a servo amplifier 49 to a thyristor control circuit 51, whose output is provided to the motor 45 to control it.

Upon arrival of each pulse from the encoder 27, the constant coefficient $\lambda$ of the setting circuit 41 is applied to the adder 39, wherein it is subtracted from the value of the adder 39, and upon arrival of each pulse from the encoder 34, a coefficient $L_s K$ of a multiplier 52 is provided to the adder 39 for addition to its value. The multiplier 52 multiplies the synchronous cutting length $L_s$ from the setting circuit 32 by a coefficient K. The synchronous cutting length $L_s$ and the cutting length $L_O$ are provided to the arithmetic circuit 43, and the operation result is applied as the correction value N to the adder 39 once for each cutting. The output from the adder 39 is converted by a D-A converter 53 to an analog signal, which is supplied as a speed correcting signal to the analog adder 48.

It is necessary that the following relationship similar to that in the case of FIG. 2 hold:

$$N_s L_s K - L_O N_m \lambda + N = O$$

If $N_s K = N_m \lambda$, it follows that $N = N_s L_s K(L_O/L_s)$. That is, where $L_s < L_O$, N is positive, and at the beginning of one process, the motor 45 is driven to feed the material 12 at a speed higher than the synchronous speed, and before the length of the material 12 being fed reaches the cutting length $L_O$, the motor 45 is decelerated to feed the material 12 at the synchronous speed. In the case of $L_s > L_O$, N is negative, and at the beginning of one process, the motor 45 is driven to feed the material 12 at a speed lower than the synchronous speed, and before the length of the material 12 being fed approaches $L_O$, the motor 45 is accelerated to feed the material 12 at the synchronous speed.

Figure 5:
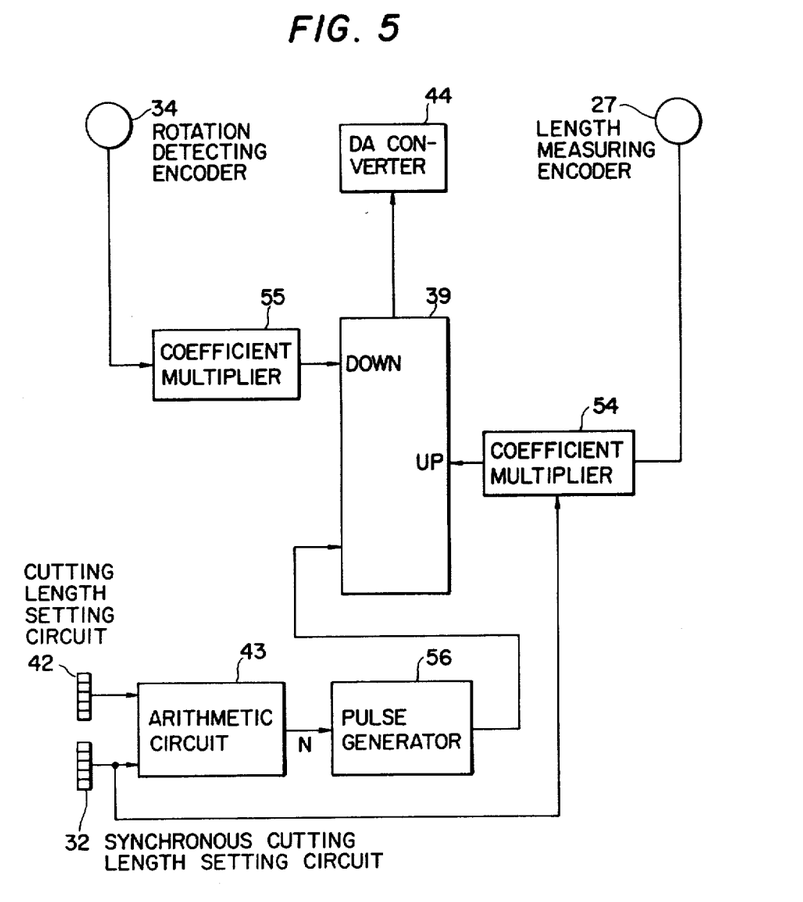
FIG. 5 is a block diagram showing the principal part of the embodiment of FIG. 2 employing an up-down counter as the adder.

In the above, the coefficient $K/L_s$ and $\lambda$ are applied in the form of binary numbers or binary-coded decimal numbers to the adder 39 for addition and subtraction; but it is also possible to employ a reversible counter as the adder 39 and to apply thereto pulses corresponding to the coefficients $K/L_s$ and $\lambda$. This is shown in FIG. 5 as being applied the example of FIG. 2. The pulses from the encoder 27 are provided to a coefficient multiplier 54, wherein they are multiplied by the coefficient $K/L_s$, that is, the number corresponding to the coefficient $K/L_s$ is thinned out from the input pulses, and the output pulses from the coefficient multiplier 54 are applied to an up-count terminal of the reversible counter serving as the adder 39, wherein they are up-counted. The pulses from the encoder 34 are multiplied by the coefficient $\lambda$ in a coefficient multiplier 55 and supplied to a down-count terminal of the adder 39, wherein they are down-counted. Further, the correction value N from the arithmetic circuit 43 is converted by a pulse generator 56 into the corresponding number of pulses, which is provided to the up- or down-count terminal of the adder 39 in accordance with the polarity of the correction value N.

While the present invention has been described above as applied to the cutting control for a rotary saw, the invention is also applicable to the rocking type drum shear. In such a case, the blade speed change mechanism for rocking the blades, for example, the eccentric gear 18 shown in FIG. 1 is adjusted instead of adjusting the radius of gyration of the cutter 26. The material may be fed not only by the leveler but also by a pinch roll or the like. Also, it is possible to drive a tacho-generator by the motors 20 and 45 to obtain their revolving speed signals and to use them in place of the outputs from the frequency-to-voltage converters 35 and 29.

It will be apparent that many modifications and variations may be effected without departing from the scope of the novel concepts of this invention.

What is claimed is:

1. A cutting control apparatus for cutting, by a rotary type flying cutter, a sheet, pipe or like material fed by a feeder, comprising:
    a reference speed signal generator for dividing a travelling speed signal of the material by a synchronous cutting length corresponding to setting of a blade speed change mechanism of the rotary type flying cutter;
    a motor supplied with the output from the reference speed signal generator as a reference speed signal to drive the blade of the rotary type flying cutter;
    a motor supplied with the output from the reference speed signal generator as a reference speed signal to drive the blade of the rotary type flying cutter;

a length-measuring encoder for generating length-measuring pulses corresponding in number to the length of the material being fed;

a rotation detecting encoder for generating rotation pulses corresponding in number to the rotation of the motor;

an adder supplied with an additive input that the length-measuring pulse is multiplied by a coefficient inversely proportional to the synchronous cutting length and a subtractive input that the rotation pulse is multiplied by a constant coefficient;

an arithmetic circuit for performing an operation of a correction value on the basis of set cutting length and the synchronous cutting length and applying the correction value to the adder for each cutting; and a D-A converter for converting the output from the adder into an analog signal and using it as a correction signal for the reference speed signal.

2. A cutting control apparatus according to claim 1, wherein the adder performs an addition and a subtraction in terms of binary number, wherein upon each occurrence of the length-measuring pulse, a value inversely proportional to the synchronous cutting length is added to a value of the adder, and wherein upon each occurrence of the rotation pulse, a constant coefficient is subtracted from the value of the adder.

3. A cutting control apparatus according to claims 1 or 2, wherein letting $L_O$ represent the set cutting length, $L_s$ represent the synchronous cutting length, $K/L_s$ represent the coefficient for multiplying the length-measuring pulse, $\lambda$ represent the constant coefficient for multiplying the rotation pulse, $N_m$ represent the number of the length-measuring pulses produced when the material travels unit distance and $N_s$ represent the number of the rotation pulses produced during one rotation of the blade of the cutter, when $N_s\lambda = N_m$, the arithmetic circuit performs the following operation:

$$N = N_s\lambda(1 - L_O/L_s)$$

4. A cutting control apparatus for cutting, by a rotary type flying cutter, a sheet, pipe or like material fed by a feeder, comprising:

a reference speed signal generator for dividing a travelling speed signal of the material by a synchronous cutting length corresponding to setting of a blade speed change mechanism of the rotary type flying cutter;

a motor supplied with the divided output as a reference speed signal to drive the blade of the rotary type flying cutter;

a length-measuring encoder for generating length-measuring pulses corresponding in number to the length of the material being fed;

a rotation detecting encoder for generating rotation pulses corresponding in number to the rotation of the motor;

an adder supplied with an additive input that the length-measuring pulse is multiplied by a constant coefficient and a subtractive input that the rotation pulse is multiplied by the synchronous cutting length;

an arithmetic circuit for performing an operation of a correction value on the basis of a set cutting length and the synchronous cutting length and applying the correction value to the adder for each cutting; and a D-A converter for converting the output from the adder into an analog signal and using it as a correction signal for the reference speed signal.

5. A cutting control apparatus according to claim 4, wherein the adder performs an addition and a subtraction in terms of binary number, wherein upon each occurrence of the length-measuring pulse, the constant coefficient is added to a value of the adder, and wherein upon each occurrence of the rotation pulse, the synchronous cutting length is subtracted from the value of the adder.

6. A cutting control apparatus according to claim 4, wherein letting $L_O$ represent the set cutting length, $L_s$ represent the synchronous cutting length, $\lambda$ represent the constant coefficient, $N_m$ represent the number of the length-measuring pulses produced when the material travels unit distance and $N_s$ represent the number of the rotation pulses produced during one rotation of the blade of the cutter, when $N_s = N_m\lambda$, the arithmetic circuit performs the following operation:

$$N = N_sL_s(1 - L_O/L_s)$$

7. A cutting control apparatus for cutting, by a rotary type flying cutter, a sheet, pipe or like material fed by a feeder, comprising:

a reference speed signal generator for multiplying a speed signal of a motor for driving the blade of the rotary type flying cutter, by a synchronous cutting length corresponding to setting of a blade speed change mechanism of the rotary type flying cutter;

a motor supplied with the multiplied output as a reference speed signal to feed the material;

a length-measuring encoder for generating length-measuring pulses corresponding in number to the rotation of the motor for feeding the material;

a rotation detecting encoder for generating rotation pulses corresponding in number to the rotation of a motor for driving the blade of the cutter;

an adder supplied with a subtractive input that the length-measuring pulse is mutiplied by a constant coefficient and an additive input that the rotation pulse is multiplied by a coefficient proportional to the synchronous cutting length;

an arithmetic circuit for performing an operation of a correction value on the basis of a set cutting length and the synchronous cutting length and applying the correction value to the adder for each cutting; and a D-A converter for converting the output from the adder into an analog signal and using it as a correction signal for the reference speed signal.

8. A cutting control apparatus according to claim 7, wherein the adder performs an addition and a subtraction in terms of binary number, wherein upon each occurrence of the rotation pulse, a coefficient proportional to the synchronous cutting length is added to a value of the adder, and wherein upon each occurrence of the length-measuring pulse, the constant coefficient is subtracted from the value of the adder.

9. A cutting control apparatus according to claims 7 or 8, wherein letting $L_O$ represent the set cutting length, $L_s$ represent the synchronous cutting length, $\lambda$ represent the constant coefficient for multiplying the length-measuring pulse, $L_sK$ represent the coefficient for multiplying the rotation pulse, $N_m$ represent the number of the length-measuring pulses produced when the material travels unit distance, and $N_s$ represent the number of the rotation pulses produced during one rotation of the blade of the cutter, when $N_sK=N_m\lambda$, the arithmetic circuit performs the following operation:

$$N=N_sL_sK(L_O/L_s-1)$$

10. A cutting control apparatus according to one of claims 1, 4 or 7, wherein the adder is a reversible counter, wherein the correction value is applied in the form of the number of pulses to the reversible counter for calculation, and wherein one of the inputs to the adder in relation to the length-measuring pulse and the rotation pulse is up-counted by the reversible counter and the other is down-counted by the reversible counter.

* * * * *